United States Patent
Gossweiler, III

(10) Patent No.: US 8,700,643 B1
(45) Date of Patent: Apr. 15, 2014

(54) MANAGING ELECTRONIC MEDIA COLLECTIONS

(75) Inventor: Richard C. Gossweiler, III, Sunnyvale, CA (US)

(73) Assignee: Google Inc., Mountain View, CA (US)

(*) Notice: Subject to any disclaimer, the term of this patent is extended or adjusted under 35 U.S.C. 154(b) by 0 days.

(21) Appl. No.: 12/938,725

(22) Filed: Nov. 3, 2010

(51) Int. Cl.
*G06F 7/00* (2006.01)

(52) U.S. Cl.
USPC .......................................... 707/754

(58) Field of Classification Search
USPC .......................................... 707/754
See application file for complete search history.

(56) References Cited

U.S. PATENT DOCUMENTS

| | | | |
|---|---|---|---|
| 7,287,214 B1* | 10/2007 | Jenkins et al. | 715/205 |
| 7,890,047 B2 | 2/2011 | Kidd et al. | |
| 2002/0015106 A1* | 2/2002 | Taylor, Jr. | 348/465 |
| 2005/0102698 A1 | 5/2005 | Bumgardner et al. | |
| 2007/0199025 A1 | 8/2007 | Angiolillo et al. | |
| 2009/0138441 A1* | 5/2009 | Valentine et al. | 707/3 |
| 2010/0274714 A1 | 10/2010 | Sims et al. | |
| 2010/0306671 A1 | 12/2010 | Mattingly et al. | |
| 2012/0303444 A1* | 11/2012 | Vadlamani et al. | 705/14.42 |

\* cited by examiner

*Primary Examiner* — Ajith Jacob
(74) *Attorney, Agent, or Firm* — Fish & Richardson P.C.

(57) ABSTRACT

A computer-implemented method for managing media-related queries, includes receiving media-related search parameters at a computer system; storing, in computer memory of the computer system, data for performing a search corresponding to the parameters; and periodically executing the search automatically on the computer system to generate a group of media programs for a user and transmitting the information for the group of media programs to a device associated with the user.

22 Claims, 9 Drawing Sheets

MANAGING ELECTRONIC MEDIA COLLECTIONS

TECHNICAL FIELD

This disclosure relates to electronic program guides and collections of items of electronic media such as television programs, movies, and the like.

BACKGROUND

Program guides allow people to reference, among other information, the date, time, and channel that television or other programs are scheduled to be broadcast. Programs can include television shows, radio shows, movies, and other forms of electronic media that are broadcast from a source such as a television antenna or cable provider. Program guides often include programming information in addition to simply the title of the program; for instance, the information may include a listing of actors, or the genre for which the particular program is categorized. Guides can be in printed form, e.g., on paper, such as can be found in a newspaper entertainment section. Guides can also be in electronic form, accessible via a computing system or a set-top box device.

SUMMARY

Methods and computer program products that enhance electronic program guides are disclosed here. In general, various systems and techniques permit users to group their media-related interests and to have updated information on those interests provided to them. For example, a user may group various media-related internet searches and other queries together into a collection, and may have that collection stored and run whenever they access a particular portion of a media program. Multiple such collections may be maintained for a user, and may be displayed as multiple books on a bookshelf. By storing such searches, persistent searching may be accomplished, so that a user can be provided, for example, with a list of upcoming television programs that relate to interests reflected in one or more of the user's collections. As one example, a user may maintain a persistent search for teen comedies, so that each time they access a media program for generating a program guide grid, search results for teen comedies playing around the current time are shown, either as a list of results, or in a displayed program guide grid.

In one implementation, a computer-implemented method for managing media-related queries is disclosed. The method comprises receiving media-related search parameters at a computer system, storing, in computer memory of the computer system, data for performing a search corresponding to the parameters, and periodically executing the search automatically on the computer system to generate a group of media programs for a user and transmitting the information for the group of media programs to a device associated with the user. The media-related search parameters can include terms in a boolean search string, or an indicator of a program genre. The stored data can include terms in a boolean search string, and the media-related search parameters can be received from a third-party after the user's selection of a control associated with the third party.

In certain aspects, the method also comprises storing a plurality of groups of data for performing a search in individual collections for generating groups of media programs for the user. The method can further comprise generating code for displaying the individual collections with an electronic program guide and for positioning the guide relative to a selection of a collection. Moreover, the method can include generating code for displaying the individual collections graphically in a bookshelf of collections. Storing the data for performing a search corresponding to the parameters can also comprise organizing the data according to collections associated with each of a plurality of users. Moreover, the method can also include copying a collection from a first user to a second user upon receiving a command from the first user.

In yet another implementation, a computer-implemented system is disclosed that comprises a request processor operable on a computer system to receive requests from remote user devices for media programs corresponding to media collections for the users; a media search repository, operable on the computer system, and storing search data associated with one or more media categories for the remote user devices; and a persistent search module on the computer system to access the search data and provide, in response, a plurality of media programs associated with a broadcast period. The persistent search module can provide the search data to an external public search engine and formats data received in response from the external public search engine to provide media program information to the users. Also, the search data can comprise search queries associated with the media categories, for provision to the persistent search module. The system can also include a grid builder module to generate code for displaying an electronic program guide grid that includes programs response to the received requests from remote user devices. In certain aspects, the search data is organized according to groups of one or more categories for each of a plurality of users.

In yet in other implementations, one or more physical non-transient computer-readable media are disclosed. The media have stored thereon instructions that, when executed, perform actions that comprise receiving media-related search parameters at a computer system; storing, in computer memory of the computer system, data for performing a search corresponding to the parameters; and periodically executing the search automatically on the computer system to generate a group of media programs for a user and transmitting the information for the group of media programs to a device associated with the user.

In another implantation, a computer-implemented system is disclosed that comprises a request processor to receive requests from remote user devices for media programs corresponding to media collections for the users, a media search repository storing search data associated with one or more media categories for the remote user devices, and means for providing a plurality of media programs associated with a broadcast period to the remote user devices.

The details of one or more embodiments are set forth in the accompanying drawings and the description below. Other features, objects, and advantages will be apparent from the description and drawings, and from the claims.

DESCRIPTION OF DRAWINGS

Like reference symbols in the various drawings indicate like elements.

DETAILED DESCRIPTION

Figure 1A:
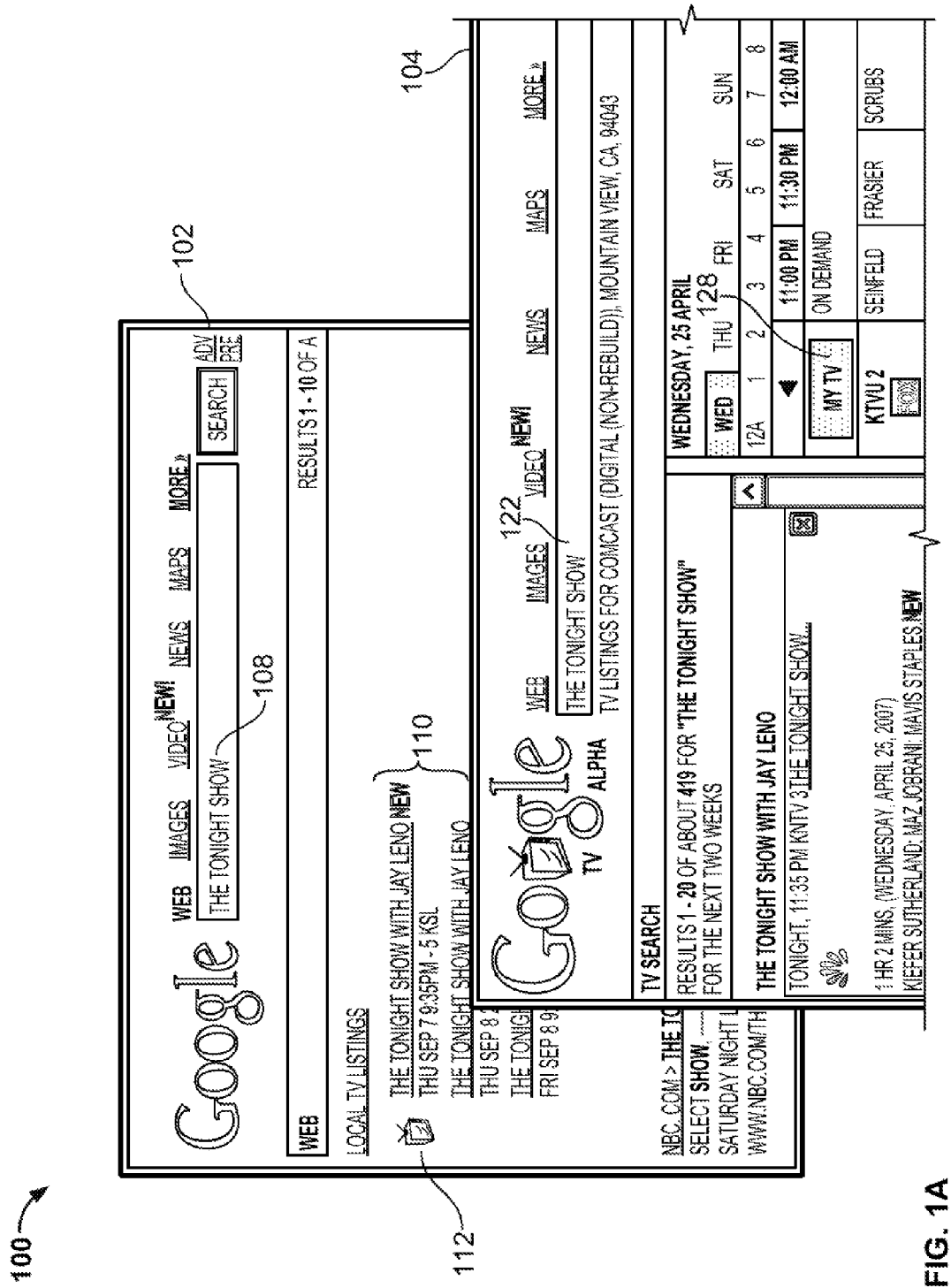
FIG. 1A shows displays illustrating interactions provided by an example program guide system.

This document discusses systems and techniques for performing searches through a user interface associated with an electronic programming guide (EPG), and for storing and organizing different forms of electronic media for convenient access by a user of a computing system. Program viewers may have certain shows, actors, genres, etc., that they are particularly fond of, but finding related information within an EPG or similar system for displaying and organizing electronic media information, can be a daunting task, especially if the EPG contains a large amount of programming information. With cable and satellite providers offering hundreds of channels of available programming for the viewer to choose from, and EPGs that can extend weeks in the future, the effective programming "grid" within an EPG can become arduous to navigate. Methods and systems for creating persistent searches of media-related information can provide information specifically tailored to a user's viewing preferences.

In the following sections, a description of EPG system is first provided, in relation to particular visual displays of the system. Particular implementations for displaying media collections within such a system are then shown and described, as are components for executing such a system, and methods for carrying out operations for such a system.

Referring now to an example of a general program guide system 100, FIG. 1 shows displays illustrating interactions provided by such a system 100. In general, the program guide system 100 allows a user to search for media programming (e.g., broadcast television, cable television, satellite television, broadcast radio, satellite radio, and Internet media) by making a search request using a search page 102. The program guide system 100 presents, on the search page 102 and/or on a landing page 104, search results that are based on the search request.

The search results include a list of one or more collections of programs related to the search request—grouped by episodes of a program. An episode as used here can include a particular showing in a series of showings (such as an episode of a sitcom), or may include a single episode of a program (such as a movie or a discrete on-line video). The search results also include a program schedule grid 120 that displays a list of channels and program episodes presented by each of the channels for a particular time period. At least one of the program episodes in the schedule grid relates to the search request made by the user. In response to a user selection of a program in the schedule grid or the list, the program guide system 100 presents detailed information associated with the program in a details page 106.

In more detail, the search page 102 includes a search box 108 where a user may input a search term, such as a portion of a television program name. The search page 102 presents preliminary search results based on the search term input. The preliminary search results may include, for example, a list of web pages having information related to the search term. In addition, the preliminary search results may include a list 110 of media programming related to the search term. The media programming list 110 may include text, such as "Local TV Listings," that identifies items in the list 110 as media programming as opposed to web page items. The media programming list 110 also includes one or more media icons 112 that indicate the types of media programming presented in the list 110, e.g., a television, radio, or webcast icon.

Where the system is able to determine that a search request was likely media-related, it can group the media results in a manner that differs from an ordinary list of search results. Specifically, as shown, each of the listings on search page 102 is shown with a title, time, and channel, whereas standard search results may be shown with a title, snippet, and URL. This special formatting of a search result may be referred to as a "one box." Other search results, such as weather, location, and similar results may also be presented in a specially-formatted one box.

The program guide system 100 may present a landing page 104 in response to a user selection of an item in the list 110. The landing page 104 includes media result groupings 116. The groupings 116 list one or more collections of programs related to the search term. The groupings 116 group collections of programs, for example, by program name with each item in a grouping being a particular episode or airing of the program. Alternatively, the groupings 116 may be grouped using another parameter, such as grouping by the media channel presenting the programs, a genre of the programs, or the time of day the programs are presented. An additional results control 118 allows a user to navigate to other groupings that are not currently displayed, and that may be groupings considered to be less responsive to the user's request.

Each of the groupings 116 may also include a "more" control 158 that lists additional results within the particular grouping. In the pictured example, the three next-pending programs are shown for the media grouping associated with the television program "The Tonight Show", and a user can select the "more" control 158 to show addition programs further in the future. Such a selection may cause the Tonight Show grouping to expand and may also cause the other groupings to be removed to make room for the expanded grouping.

The groupings can also include an "Add to my TV" control that, when selected, can add a particular program (such as a series of episodes) or episode to a personalized program guide for the user. For example, a "My TV" channel may be maintained for a user (and may be used to control a personal video recorder, or PYR), as described below, and an episode or all the episodes of a program may be added to that channel when the "Add to my TV" control is selected.

The landing page 104 also includes a schedule grid 120. The schedule grid 120 is displayed adjacent to and side-by-side with the groupings 116. The schedule grid 120 presents programming for a particular geographic location. A user may specify or change his or her location by selecting a change location control 122 and by making an input, such as a postal code (e.g., a ZIP code) or city and state names. The selected location may also be used to determine the programs presented in the list 110 and the groupings 116, such as by identifying a user's head end. Where the user is a user registered with the system 100, the user's default location may be used to generate programming suggestions.

The schedule grid 120 presents media programming for a particular time range on a particular date, such as over several hours. A user may select the date using a calendar control 146. The calendar control 146 may default to a particular date, such as the current date. When a search is performed, the grid 120 may default to the area surrounding the time and channel of the episode determined to be a best search result. Selection of other episodes in the groupings 116 may cause the grid to move automatically to display programs around the selected episode (or the first-returned episode for a particular grouping, if a grouping is selected).

The schedule grid 120 presents a list of media channels vertically along its left side and times of day horizontally along its top side in a time bar 148. The programs or episodes for a particular channel are presented in the channel's row and in a column having a time division closest to the actual time that the program is presented by its associated channel. The channels may be associated with a particular numerical channel for a broadcast, or may be a virtual channel such as a personalized channel or a stream of information over the internet.

The schedule grid 120 also includes a personalized channel 128, termed here as "My TV." The personalized channel 128 includes controls that allow a user to create a virtual channel using content from actual channels or another personalized channel, such as the personalized channel of another user. Episodes or programs may be added to the personalized channel 128 in a variety of ways. For example, a user may select a program in the schedule grid 120, and may select a command to move it to the personalized channel 128 or may drag it to the personalized channel, among other things.

Also, one user may send a message to another user that identifies a particular program, such as by supplying a URL to an on-line video, supplying an episode ID number, or through another accepted mechanism. In addition, the user may select a control such as the "Add to My TV" control, where that control is associated with a program or episode.

The schedule grid 120 includes the personalized channel 128. The personalized channel 128 is presented near the top of the grid 120 and slightly separated from the other channels to indicate that its programs are specified by the user rather than by a media provider broadcast. The personalized channel 128 can include multiple overlapping programs, and a user may be provided with various mechanisms with regard to watching and managing such programs. As one example, the programs may be displayed initially according to the times they are broadcast or are first made available for download. The user may then drag them later into time so that they do not overlap, so as to "program" a viewing schedule that the user may later follow.

Programs that are shifted in time from their actual broadcast time may be recorded when they are broadcast, such as by a PVR, and may be displayed according to the program the user has established. In this manner, a user can easily select programs to view, see whether the selected programs can be viewed when they are broadcast, and view the programs in a selected order as if they were live programs, but by time-shifting the programs in some selected manner.

A selected program cell 130 may be used to initiate an operation related to the program in other ways also, such as by navigating a user to a display that presents more detailed information regarding the program. The details page 106 presents such detailed information. The details page 106 includes a program details area 132. The program details area 132 presents detailed information regarding the program, such as a genre of the program, a runtime length of the program, names of performers in the program, a content rating of the program, a quality rating of the program, and a synopsis of the program.

The program details area 132 also includes an upcoming episodes area 136. The upcoming episodes area 136 presents a list of the upcoming episodes for the program. The list may include detail information such as an episode title, a time for the showing, and a channel on which the showing is to occur.

The details page 106 also includes a search control 138. The search control 138 allows a user to input a search term to initiate a search for a particular program. The search may be limited just to a corpus of information associated with programming, or may be performed on an entire web page corpus, depending on a selection from the user.

The details page 106 also includes an image details area 140. The image details area 140 presents images associated with the program, such as image result 140*a*. The image result 140*a* may be found by performing an Internet search for images related to the program, such as would be returned by the standard "Google Images" service. The search may be constrained in particular ways, such as by searching on a particular programming-related corpus of images or by adding certain terms, such as "television" to the query so that "Fred Thompson" returns images of the actor and not of other people. Details including a snippet, image details, and a URL that displays the image, are also provided in image details area 140.

The details page 106 also includes a search details area 142. The search details area 142 may present the results of a search for web pages related to the program, such as a search result 142*a*. The search details area 142 may simply be a proxy of results that would be shown in response to a standard search for the episode name when applied to a full corpus or a corpus limited to programming related information. Controls may also be provided so that the user can access more episodes, more image results, and more search results.

In operation, a user may initiate the program guide system 100 either by inputting a search term, such as "The Tonight Show," for a general web search using the search control 108 or a media programming search using the search control 138. In the case of the search control 108, the program guide system 100 presents the list 110 of programs related to the search term "The Tonight Show" within the search page 102 as part of a ONEBOX. Selecting a program in the list 110 directs the user to the landing page 104.

Alternatively, a user may input the search term for "The Tonight Show" using the media programming search control 138, such as is displayed on the landing page 104 or the details page 106. The search input directs the user to the landing page 104.

At the landing page 104, a user may direct the schedule grid 120 to a particular channel, time, and date by selecting a program from the groupings 116. The groupings 116 are programs determined using the search term "The Tonight Show." Each program grouping includes one or more episodes of that particular program. The user may navigate to groupings not currently presented using the additional results control 118. Selecting a particular episode in a program grouping directs the schedule grid 120 to a particular channel, time, and date. The user may also navigate through the schedule grid 120 manually using controls, such as the calendar 146 and the time bar 148. In addition, the user may "drag" the control up, down, left, or right similar in manner to moving a map in GOOGLE MAPS, and cells in the grid may be added from a queue to be displayed, and additional cells may be fetched or pre-fetched, in the manner of fetching tiles around a display in GOOGLE MAPS.

Such fetching of tiles may occur by various mechanisms. For example, the system may simply pre-fetch tiles that surround the area currently being displayed (within a certain number of tiles). Also, the fetching may proceed to fill in all channels at a currently displayed time, and then fetch information in the future or in the last direction of time-wise travel in a grid (e.g., if a user's last move was to the right, then future tiles will be fetched in that direction). This technique operates under the assumption that people are more likely to surf through channels than to look into the past or future. Under a third technique, the pre-fetching may approximate the momentum of the movement of the grid—much like air over the surface of a moving wing. More material is pre-fetched in the direction of motion (where there can be three dimensions: time, channel, and level of detail) than to the sides, and gradually less as one moves from the direction of motion to the direction opposite motion). Where motion is particularly fast, more material is fetched in the directed of motion and less to the sides of the grid. As a user's motion slows, more data in other dimensions away from the motion may be pre-fetched.

Regarding a third grid dimension for detail level, such a dimension may be implemented in various manners. In one such implementation, at a least detailed level, a program title and little more may be shown in a grid so as to permit maximum density of tile display. At a more detailed level, a rating and a short description of an episode may be shown. At a yet more detailed level, more detailed description may be shown, and an image may be shown. At a more detailed level, information duplicating or approaching that shown for the detail page 106 may be shown.

The user may navigate to the details page 106 for a particular program by selecting (e.g., clicking or double-clicking on) the program in the schedule grid 120, such as the selected program cell 130. At the details page 106, a user may view detailed information regarding the program in the program details area 132. The detailed information may be obtained, for example, from a structured database that organizes media content according to programs, actors, and other similar parameters and links the information in a relational manner.

The user may view images related to the program in the image details area 140. The images may be obtained from a structured database, such as a database associated with the detailed information, or may be obtained from disparate sources such as in the manner of GOOGLE IMAGE SEARCH. The user may navigate to an image by selecting an image result, such as the image result 140a.

The user may navigate to a web page related to the program by selecting a search result, such as the search result 142a, in the search details area 142. The user may also select an image in image details area 140 to have the image associated with the program. For example, the selected image may then be displayed in the details area 132 in place of the prior image, or a portion that is cut out of the image may be displayed in the grid 120, such as in cell 130, so that a user can make particular favorite programs more visible in the grid in a manner that the user can visually associate the cell 130 with the program (e.g., by selecting a logo or title associated with the program).

Figure 1B:
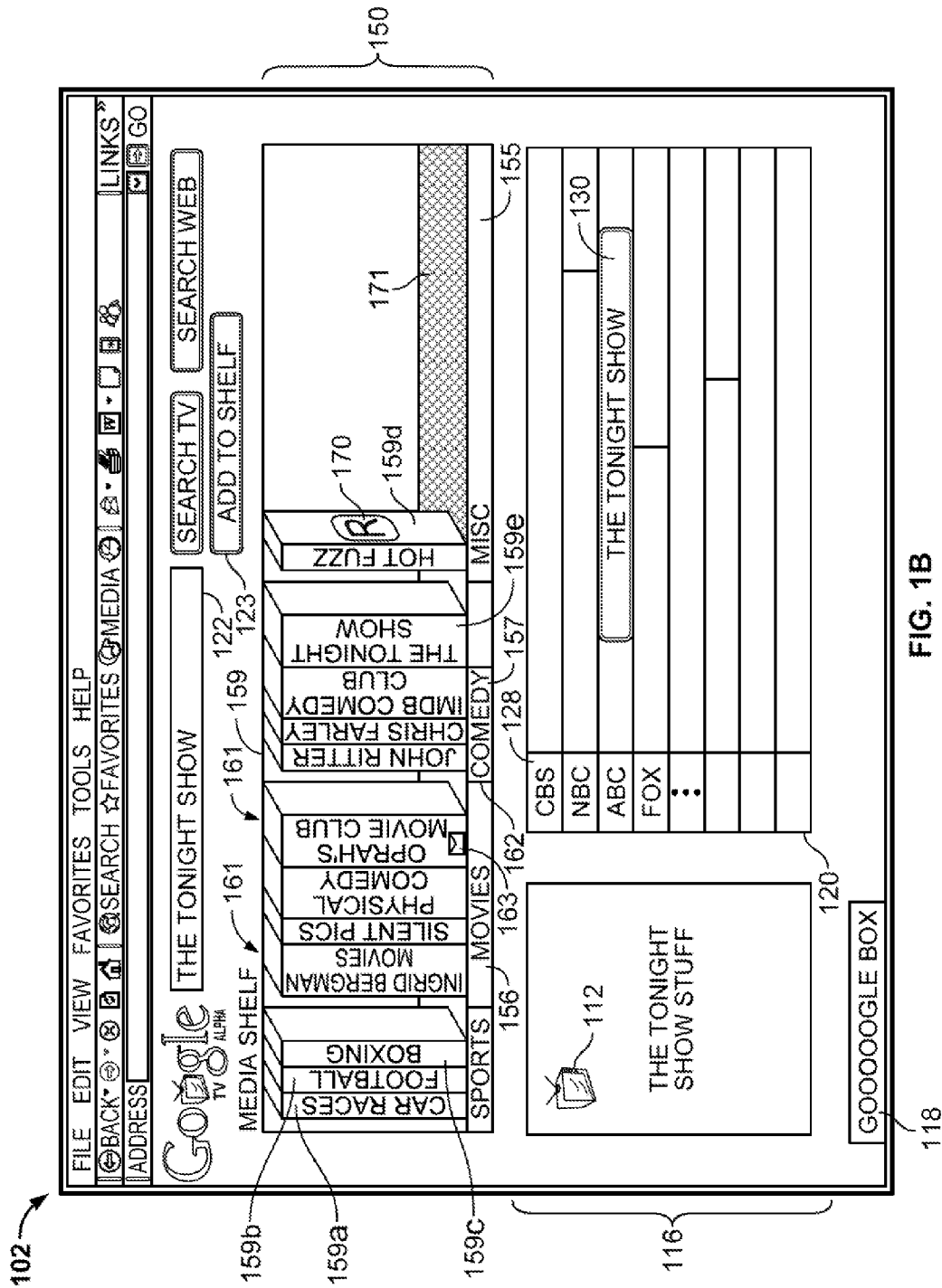
FIG. 1B shows an example landing page that includes a media shelf.

FIG. 1B is an exemplary landing page 104 that includes a media shelf 150. This example shows a particular application of a program guide such as that shown in FIG. 1A, in which collections of media are stored for a user, such as by storing persistent searches that can be repeatedly applied to structured (e.g., television schedule information) or unstructured (e.g., internet web data) data sources to generate updated results, such as to provide a user with a list or collection of media-related programs that they can watch.

Conceptually, a media shelf 150 enhances an EPG by providing an area on a user's screen that holds visual representations of programming search terms and functions, referred to here as collections 159. An example of a programming search term is "tv: Baywatch." This term, when entered into a search engine, for example, may seek out episodes of the popular television series and cause a display of an EPG to render on the user's screen that indicates when, and on what channel, episodes of Baywatch are scheduled to air. In keeping with a coherent stylistic theme, the "shelf" 150 can represent categories of programming, and the programming search terms and functions are graphically represented as books on the shelf.

While it is possible for a user to repeatedly enter search strings into a search engine every time they wish to seek programming information about a particular show, it can be advantageous to instead represent the content of the string as an interactive graphic (i.e., the books as shown in FIG. 1B), where the user may simply click, for example, on the graphic and cause the same search action to occur as if they entered the search string manually, i.e., typographically. In this manner, a user can fill their media shelf 150 with their favorite media searches (collections 159) and simply click on any one of them to display the results of that search in an EPG format.

As described in detail below, the search strings represented by the collections 159 can be stored on a remote computer. When a user initiates a programming search via one of the collections 159, the search string stored on the remote computer is retrieved and used as the search term for the query. The results of that query are then returned to the user.

The collections 159 may be categorized on the shelf 150 by some attribute that is common among the various programs within a particular shelf or sub-shelf (e.g., the "misc." sub-shelf 155), or simply by user preference. In FIG. 1B, media shelf 150 includes sub-shelves for sports, movies, comedy, and "misc." On top of each shelf are collections 159 that belong to that shelf or portion of a shelf. For example, the sports shelf includes collections 159 including "car races" 159a, "football" 159b, and "boxing" 159c.

Shelf names and other identifiers can be customized by the user to fit their particular programming interests; alternatively, shelf names may be automatically-assigned names or identifiers that represent the category. Shelf categories may be based on, for example, genres, programming type (e.g., movies, talk show, radio broadcast, etc.), favorite actors or actresses, or any other categorization scheme suitable to the user. Attributes of shelves can include text, graphics, colors, or other display features. For example, a shelf may include holiday decorations (e.g., graphics of holly or mistletoe) for collections 159 relating to the Christmas season. As another example, the "misc" sub-shelf 155 has a cross-hatched pattern that can indicate collections 159 that may be intended for mature audiences. The collections 159 associated with each shelf are user-customizable and may be assigned to a shelf by a user based on their categorization preferences. For example, the "comedy" shelf contains an entry titled "Chris Farley," but this entry could have equally been assigned to the "movies" category, since the comedian starred in several popular films.

The graphical representation of collections 159 can include visual indicators that alert or inform the user of some aspect of its content. For example, the collection "Hot Fuzz" 159d on the "misc" shelf 155 represents a search for a movie that is rated "R" and thus it may not be appropriate for some viewers. A visual identifier 170 clearly identifies it as such, and therefore a conscionable user may choose to avoid searching for the movie if they are in the presence of minors. Other potentially useful identifiers may include the language that the show is broadcast in, whether it is broadcast in high-definition, or if it is considered "premium content," where the user would pay a fee to view the program, for example.

Also, where a collection relates to a general search string that may generate a number of different program results, a visual indicator may be provided to show the number of upcoming programs (e.g., during the coming prime time period or over the next week) that are responsive to the query.

In such a manner, a user may readily see where relevant upcoming programs or episodes exist, without having to expand and review particular categories.

The media shelf 150 provides programming search functionality within an intuitive user interface. The various collections 159 on a shelf 150 contain hidden (from the perspective of the user) search terms that are processed by a search engine to perform a query for programming content based on the search terms or other search parameters. In one implementation, the collections 159 are clickable hyperlinks that, when executed, send information to a server where it is processed as a search query for programming information. The results of the search can be displayed in a user-chosen format. For example, the user may wish to view a programming grid 120 wherein the searched programming content is highlighted within the grid 120. The results of the search may also be displayed in list form, for example, within list view 116. The search may also be conducted before a user clicks on a particular collection, such as where the system displays a visual indicator near each collection to show the number of programs that are responsive to the particular search.

Collections 159 can be added to a particular shelf 155 by a variety of methods. In one embodiment, a user can drag the contents of a particular cell within a program grid 120 to a selected shelf without performing a search. For example, the user may be viewing an EPG and happen upon an episode of "The Tonight Show" 130 that they wish to watch. To add the show "The Tonight Show" to their media shelf 150, the user can click and drag the cell to an appropriate media shelf 150 location. In this embodiment, programming information related to "The Tonight Show" can be incorporated into the collection 159e from various sources. In one embodiment, the name of the show can be the only search parameter; in other embodiments, other ancillary information related to the show may be added, including the broadcast network, the host, the time, etc. These types of information are frequently found on publicly-available databases, such as at www.tvguide.com. Following the above example, the user could then click on the new "The Tonight Show" collection 159e to view past, present, or future scheduled episodes of "The Tonight Show."

Users can also add collections 159 to a shelf 150 after refining search terms that lead to a successful result. For example, a user interested in watching The Discovery Channel's mini-series "Planet Earth" may enter "planet earth" into a search box 122 and be presented with a multitude of non-related programs, including: "The Last Man on Planet Earth" (a TV show), Lenny Kravitz's "Alive from Planet Earth" (a music video), and "Doin' Time on Planet Earth" (a movie). However, adding Planet Earth's commentator "Sigourney Weaver" to the search query may result in a successful finding of the user's desired show. The user can add a new collection for the search query terms that resulted in a successful find, for example by clicking an "Add to Shelf" button 123 and modifying or editing the collection as described below.

Users may drag collections 159 from one shelf to another, which may be advantageous if, for example, their categorization scheme has changed or is going to be changed. Likewise, for simplicity, a user may copy a collection 159 from one shelf to another.

In some instances, a user may have more collections 159 on their shelf 150 than their screen may physically allow for. Controls 161 allow visual compression or hiding of one or more collections 159 on a shelf 150. In FIG. 1B, a user can, for example, drag one of arrows 161 toward or apart from one another to expand (show) or compress (hide) the collections 159 on the "movies" shelf 156. In a similar fashion, a user can reduce or increase the number of collections 159 shown on the movies shelf 156 by dragging divider 162 (which divides the "movie" shelf 156 from the "comedy" shelf 157) in an appropriate direction.

In other embodiments, collections 159 can be stacked "on top" of one another, visually, so as to create more room for collections 159 on adjacent or adjoining shelves (shown in FIG. 1C for the "kids" shelf). For example, the collections may be shown as an entire multi-level bookshelf.

In some embodiments, functionality is provided to allow the user to quickly reference select details of a future program without necessarily performing a search for its location (e.g., time and channel) on a displayed EPG. In one implementation, for example, a user can place their cursor over a collection 159 and receive a pop-up window containing information about a program or programs that are responsive to the information in the collection. For example, by placing their cursor over the "The Tonight Show" collection 159e, the user can be presented with a quick synopsis of the next-airing show, including, for example, the scheduled guests, music, and features. While not only potentially intriguing to the user, this functionality provides a convenient method to decide between, for example, two shows that may have conflicting broadcast times. Other related results may also be shown, such as indications for viewing re-runs of Tom Snyder's "Tomorrow" program, because such results may be closely related to The Tonight Show.

In some embodiments, users can indicate a level of desirability to view a certain program. This level can be used, then, in conjunction with visual indicators to alert the user that the desired programming has been found and is scheduled to be broadcast. As an example, a user may be an avid fan of the Minnesota Twins baseball team and have a particular distain for the Cleveland Indians. A baseball game between the two would likely be one that the user would enjoy watching. In this case, the user can set up a collection 159 that is a persistent programming search that includes the terms "Minnesota twins Cleveland Indians baseball," for example. Upon finding a match for the query by the search engine (described below), which could be far in the future from when the user created the collection 159, the sports shelf 155 and/or the particular collection 159 may alert the user to the scheduled broadcast. Such a search may be, for example, one of a number of searches in a single collection that covers a particular user's most favorite sports topics.

In one implementation of the above embodiment, the collection 159 itself may, for example, flash bright colors to alert the user to the event. In another embodiment, which can be useful if, for example, the collection 159 is hidden by compression of a shelf 150 as described above, the shelf containing the collection 159 may display an alert, such as a textual message or other indicator telling the user that a high-priority event has been found.

In a further embodiment, a message, such as an e-mail, text message (e.g., an SMS message) or other form of communication can be sent to the user to alert them to the programming event for which they indicated interest. A user can set an "alert level," which could range from no alert (low interest) to high alert (where, for example, an e-mail or text message is sent to the user), through the set-up process of a collection 159 as described more completely below.

Collections 159 can be transmitted from one user to another. Often, when a group of people is absorbed in a particular program, it gives them pleasure to talk about the characters, the plot, or the progress of an adventure, for example. Fans of some shows therefore often try to entice others (e.g., their friends or family) to watch the same show. In some cases, a friend, for example, who may not regularly watch the show may be more inclined to watch if it were easy for them to find the show on an EPG. This can be true especially, e.g., in the case in which a friend in California tries to convince a friend in Washington, D.C. to watch a show, where each viewer has completely different programming providers and programming schedules.

In the above scenario, the user in California can transmit the collection 159 for the particular program to the friend in Washington D.C. This may be accomplished by a variety of methods. A user can send another user a collection 159 by, for example, knowing the other user's GMail account name (such as an e-mail address) and sending the collection 159 from the search page 102. Alternatively, in some embodiments, collections can contain executable portions containing instructions for sending collections; icon 163 on the "Oprah's Movie Club" is one example. When icon 163 is selected by the user, a prompt may be presented that asks for the recipient's e-mail address or other identifiable information, and the collection 159 is sent to the recipient thereafter. The recipient, upon receiving the collection 159, may choose to add it to their existing collection, place it on a shelf of their choice, or delete it completely.

Users may also actively obtain collections formed by other users. For example, a user may make one or more of their collections accessible over a web page, and other users may review the collections and choose to have the collections copies to their library of collections. In such a manner, certain "thought leaders" may become known as people who set up very cool collections, and others may visit their web sites or pages (e.g., in a social network application) and copy them or subscribe to them. In this manner, members of a community may be steered to similar programming and may then later discuss the programming.

In some embodiments, advertising information can be displayed on the search page 102 that is in response to a programming query using the media shelf 150. Referring to the previous scenario where a user is a particular fan of the Minnesota Twins baseball team, performing searches through the media shelf 150 that relate to baseball may cause targeted advertising to be displayed somewhere on the search page 102 from, for example, a clothing vendor that sells jerseys or other baseball paraphernalia.

In another embodiment, a user can be alerted to actual events, i.e., "live events" such as plays, sporting events, music festivals, and other events, if the information about the event is provided in a searchable format such as in an on-line newspaper. In these cases, the collection 159 may indicate a scheduled broadcast of the event, and also include a notification that the event is occurring locally, and provide a location for the event. The determination that a "live event" will occur near a user's location may be accomplished by using user information stored in a user profile, for example. User profiles can contain information such as the user's location, and media preferences (e.g., sports, theatre, movies, etc.), for example. In certain implementations of the preceding embodiment, when a user is notified of a live event, a link to an on-line ticket repository (such as Ticketmaster) may be provided such that the user can purchase tickets to the event. In another example, if a user has a collection that relates to a particular program and a DVD set for a season of the program is about to be released, the user may be informed of the release, and may be directed to stores in their area that are selling the DVD set or to on-line stores from which they can obtain the product.

The viewing and/or searching habits of the user can be monitored and/or analyzed to suggest programming based on other users' collections 159. In these embodiments, for example, a user's search queries, including frequently-used keywords or repeated collection 159 submissions can be compared with other users' collections 159. If a match is found between a first user's search parameters and a second user's collection 159, a recommendation can be displayed offering to add the second user's collection to the first user's media shelf 150. The second user need not necessarily be aware or informed that the first user has received this information, and identifying information of the second user would not be provided to the first user.

As an example, a first user may submit multiple queries for the actor "Dennis Leary." The system 100 may recognize that the first user is therefore a fan of Dennis Leary, and begin seeking other users' media shelf collections for collections 159 containing that actor's name, or other parameters associated with the actor. The system 100 can analyze or compare the collections 159 of the first user with those of other users' similar collections, and recommend programming or other media events to the first user that may be absent.

In addition to suggesting programming to the user based on their collections 159, the system 100 can similarly deliver revenue-based content, such as advertising, on-line coupons, promotional products, or other products. In some embodiments, the system 100 may determine preferences of the user and deliver select commercials or other media content that make the commercials or other media more likely to be viewed by the user. For example, the system may recognize that a user has collections 159 "Sex and the City," "Footloose," and "Extreme Measures," all of which either star, or co-star the actress Sarah Jessica Parker. The same actress is also the spokesperson for her own line of clothing as well as for The Gap retail stores. The system 100, then, may conclude that such a fan of Sarah Jessica Parker may be a willing participant to view a commercial or advertisement from The Gap, and display such content to the user.

The system may concatenate or edit data contained within collections 159 to make a search query more successful or robust. For example, a user may be a fan of the television show "Rescue Me," and this query alone may provide adequate results in EPG searches for the user. However, to aid and establish some of the features described above, the system 100 may seek out ancillary information to add to the collection 159. For example, the system 100 may add to a user's "Rescue Me" collection 159, the actors that appear in the television show, their biographies and other show appearances, the genre of the show, the rating, etc. This metadata can aid the system 100 in performing cross-user collections 159 for the embodiments where shows and other media events can be recommended to a user based on the data contained in their media shelf 150.

Because families typically share televisions and other electronic viewing devices, the displayed media shelf 150 can be customizable for individual family members, yet still be considered as one media shelf "account." For example, a father may have his own collections, as may a mother, and their daughter. In each case, the contents of the media shelf 150 can be customized with respect to the information that is displayed. For example, the father may set an adult media shelf 150 as "private" or "hidden," whereby the contents would not be displayed unless a special access code were input. In some embodiments, the contents of each member's media shelves 150 can be displayed in one "master" media shelf, wherein all collections 159 can be displayed (such as by showing a selectable tab for each member). By analogy, each family member may have one or more shelves in a larger family-wide bookcase.

Figure 2:
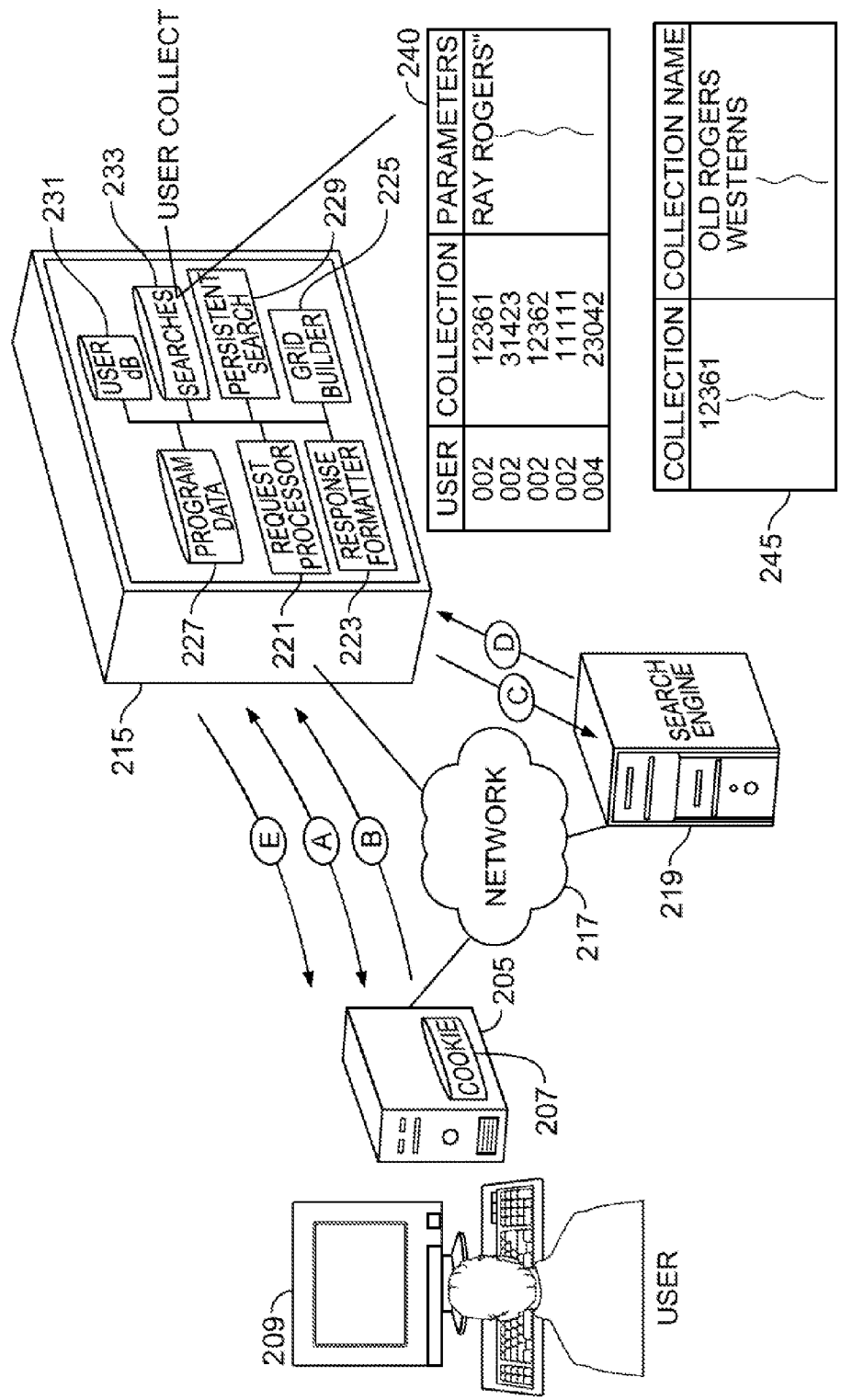
FIG. 2 is a conceptual diagram of a system and process for sharing media-related information.

FIG. 2 shows computers, program components, and data repositories that can be used to enable the system 100 according to one embodiment. Such a system may include a user's computer that may employ a web browser or other application to access information from a remote server system 215, which stores information about the user's preferences so that media collections may be updated as a user wishes to access them, and the updated information may be provided to the user. Although the particular system shown here is very server-based, in that much of the media-serving functionality is sited on the remote server system 215, more functionality, such as storage of collection information and processing of the information to display persistent search results and/or recommendations to the user, may be located on the user's computer 205.

The user's computer 205 contains, according to one embodiment, an identifier, such as a "cookie" 207 that identifies the user to the remote server system 215. The user's computer 205 contains the necessary hardware and software components to be able to visualize web sites and graphically display the information illustrated in FIGS. 1A-1C, for example, such as that described in detail in FIG. 5.

The user's computer 205 is in communication with the remote server system 215 via a computer network 217 such as the internet. The remote server system 215 stores various computer programs ("modules") containing executable, or reference able application instructions, and also stores data in repositories. A third-party computer 219 can perform the operations of searching the computers on the network 217 for information relating to programming media and storing that data within. Third-party computer 219 can also contain data that has been added to it by users, and is not limited solely to information it has found during a search.

Remote server system 215, as illustrated in FIG. 2, includes, in this example, three computer modules that carry out select aspects of the system computing operations. A request processor 221 performs the operations of processing requests from the user, for example, to search for programming content by way of a search request using a program content entry 159 or to begin a new search. The request processor 221 can identify the user (or the user's computer) by a transmitted cookie 207, or by having the user log on to a pre-established account, such as a GMail account. If the request involves searching for program content, the request processor 221 can parse the request into constituent components. The request processor 221 can also "re-format" the request into computer code or logical structure that may make a search more robust or simpler. For example, some third-party computers 219 may have a pre-defined search scheme with predefined fields and commands that are unique to its service.

The request processor 221 also performs operations related to the various embodiments described above wherein a search string is analyzed or modified before executing the actual programming search. For example, the request processor 221 can analyze a search string, compare certain terms with an electronic thesaurus, and include additional terms in the search string to create a more robust query.

The response handler 223 receives information back from third party computers 219 with respect to the search query, and alternatively, or in addition, prepares information for return to the user's computer 205. The response handler 223 can parse the search results into a form that is useable by the remote server system 215, as well as extract the pertinent information related to the search. For example, the response handler 223 can extract channels, dates, and times for a requested media event from a third party computer 219 and format the data into a table that is later stored or used by grid builder 225. The response formatter 223 also contains instructions for determining which of retrieved data is pertinent to a user's query. Data that is likely to be relevant may be passed to the grid builder 225; other data may be discarded or alternatively stored within the program data repository 215 where it can be accessed for other users' queries.

Grid builder 225 is a module containing instructions for constructing EPG grids of the type exemplified in FIGS. 1A-1C; the module can extract information from a repository of program data 227 and/or utilize data received from the response formatter 223. The grid builder 225 can create, for example, HTML tables or other forms of web-based spreadsheets or tables, and transmit that code to the user's computer 205 for display.

The grid builder 225 can additionally create the necessary HTML or other computer code necessary to create, for example, pop-up box 181 and related features. "Active" content, such as links to third-party websites pertaining to a particular show can be integrated into the EPG cells by the grid builder 225 by accessing data contained within the program data repository 227 and analyzing search results from the response formatter 223.

A persistent search module 229 performs operations relevant to searches that the user wishes to keep "alive" indefinitely. Information contained in a user database 231 or a "searches" repository 233 (described below) can include data that tell the persistent search module 229 that the search terms are meant to be repeatedly searched for new and/or updated programming or event information. The persistent search module 229 may periodically "sweep" the user databases 231 and/or searches repositories 233 where one or more exist, as would be the case in a multi-user environment. Upon finding a search that is tagged, for example, as "persistent," the remote server system 215 can execute the search for the user without the user's knowledge or input. For example, when a user accesses a media shelf or a collection on the shelf, a signal may be provided to the remote server system 215 to conduct a stored search associated with the collection and/or shelf.

Media programming information is kept in a program data repository 227. The repository 227 can store programming information that is obtained by third-party computers 219, such as search engines which carry out the queries posed by the user. The program data can be stored in a format that allows indexing and searching of the data, such as in tables, flat-files, lists, and the like.

A user database 231 stores information about the user. User information can include, for example, the user name, identification or account number, physical location, information related to cookies 207 stored on the user's computer 205, profile information about a user, and links to the search parameters stored in the "searches" repository 233 or the search parameters themselves.

The "searches" repository 233 includes a collection of the search parameters that users have stored. The contents of the search parameters can be indexed or stored in any logical fashion that allows the information to be retrieved upon request to execute a search for programming information. An exemplary table of search data 240 is shown in FIG. 1C. The table 240 is indexed by a user identifier, in this case an identifying number under the "user" column. "Collection" can refer to, for example, an identifier of a user's media shelf 150; the parameters, such as a media shelf 150 name, can be included in a "parameters" column. A collection can be expanded to include additional information (e.g., in table 245), such as the collection name. The combination of a user ID and a collection ID may provide a unique field for a particular collection.

Lettered arrows in the figure show one example by which information can be processed and passed between particular components or sub-systems to permit a user to create and track collections of media-related information. In particular, a user can receive programming information in an EPG format according to the following exemplary sequence of events. Initially, the user may communicate with the remote computer system 215 and log in to an account set up for the user (arrow A). The user can then send a request for programming information by, for example, performing a mouse-click on a collection 159, arrow B (with the assumption that the user account and the parameters for the specific collection have been previously established). The request carries with it a user identifier, and an identifier of the particular collection 159. On the remote computer system 215, the request processor 221 receives the request and accesses the user database 231 to retrieve the appropriate search parameters for the collection 159, which may be stored in the searches repository 233.

The search string is constructed and formatted for the type of search requested. The request is then sent to a third-party computer 219 as a search query, arrow C. The results of the search query are returned to the remote computer 215 (arrow D) and received by the response formatter 233, which parses the results and passes them to the grid builder 225 and, optionally, the program data repository 227 for storage. The grid builder module 225 can receive the information from the response formatter 223 and construct a table or other display of the data in an EPG format. The EPG data, which may, for example be in the form of an HTML table, are sent to the user's computer 205 (arrow E) for display, and includes media-related programming information related to the collection 159.

The EPG data can include additional functionality beyond a simple table of channels, times, and programming content. In some embodiments, the EPG data includes, for example, web links to pages about a particular show, or program code that allows functionality such as the pop-up windows 181 described in FIG. 1C. The response formatter may then combine code for generating the grid, from the grid builder 225, with other code, and may transmit it back to the user's computer 205 (arrow E) for review by the user, such as in the form shown in FIGS. 1B and 1C.

Figure 3:
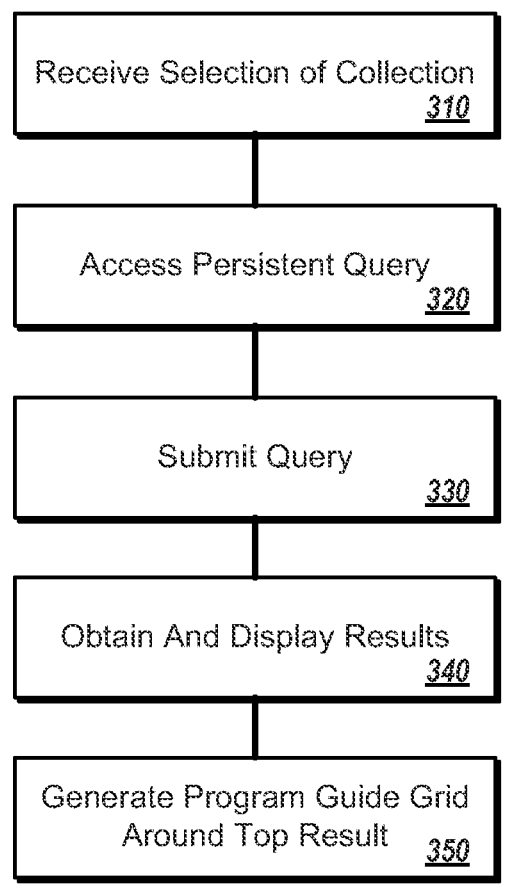
FIG. 3 shows a simplified series of events for querying program information from a network of computers according to one embodiment.

FIG. 3 is a flowchart of a process for querying program information from a network of computers according to one embodiment. Particular actions in the flowchart are identified here as occurring with respect to particular structures shown in FIG. 2 for illustrative purposes, though the actions may also be carried out by a variety of other mechanisms also.

Beginning at step 310, a remote computer receives a search query for a collection of programming information from a user, e.g., a collection 159. At step 320, if the query has been stored within the user database 231 or the searches repository 233, the search is accessed. The query is submitted to a third-party computer at step 330. The third-party computer then performs the search and returns the results back to the remote computer 215; the results are then formatted by the response handler 223 for display, at step 340. Lastly, at step 350, the EPG data is generated on the user's display, where the data is formatted such that relevant search results are highlighted or otherwise presented so that the user's search query parameters are visually outstanding.

Figure 4:
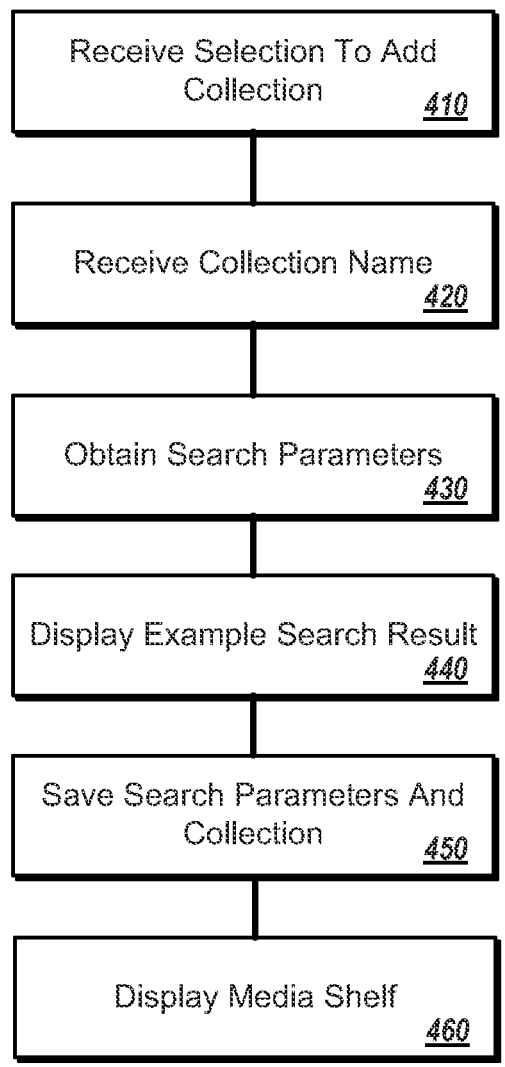
FIG. 4 shows a simplified series of events that can be followed to add a new collection to a media shelf.

FIG. 4 is a simplified series of events that can be followed to add a new collection 159 to a media shelf 150. Beginning at step 410, the system 100 receives a selection, for example, a selection of a program from a cell within an EPG, that a user wishes to add to their media shelf 150. The system 100 can receive notification of the action using the methods previously described, for example, by dragging the contents of an EPG cell to a media shelf.

At step 420, a collection name is assigned to the selection and received by the system 100. The collection name can be the name of the show defined by the EPG data, for example, that shown in EPG window 120, or the name can be defined by the user, such as for a genre or other description.

Next, at step 430, the search parameters associated with the selection are received. The search parameters can include strings of text, for example, that include program titles, actor names, genres, etc., as described above. In some embodiments, identifiers, including unique program identifiers can be associated with a particular show that is included with the EPG data contained in the EPG window 120. In some embodiments, dragging an EPG cell (e.g., cell 130) to a media shelf 150 can bring all of the associated programming information with it; this information can then be incorporated into the search parameters of the collection 159. With an abundance of data included with one particular show, the likelihood of a user successfully finding their show within a large database of EPG information may increase significantly.

At step 440, an example search result can be displayed for the user to determine if their search query is constructed of terms that result in acceptable results. In one embodiment, the user's initial search string can be displayed so that the user can add or remove terms, or otherwise modify the query until they are satisfied with the results they receive. At this point, the user can elect to save the search parameters and optionally assign the query to a collection, step 450. Finally, the media shelf can be displayed that incorporates the new collection 159, step 460.

Figure 5:
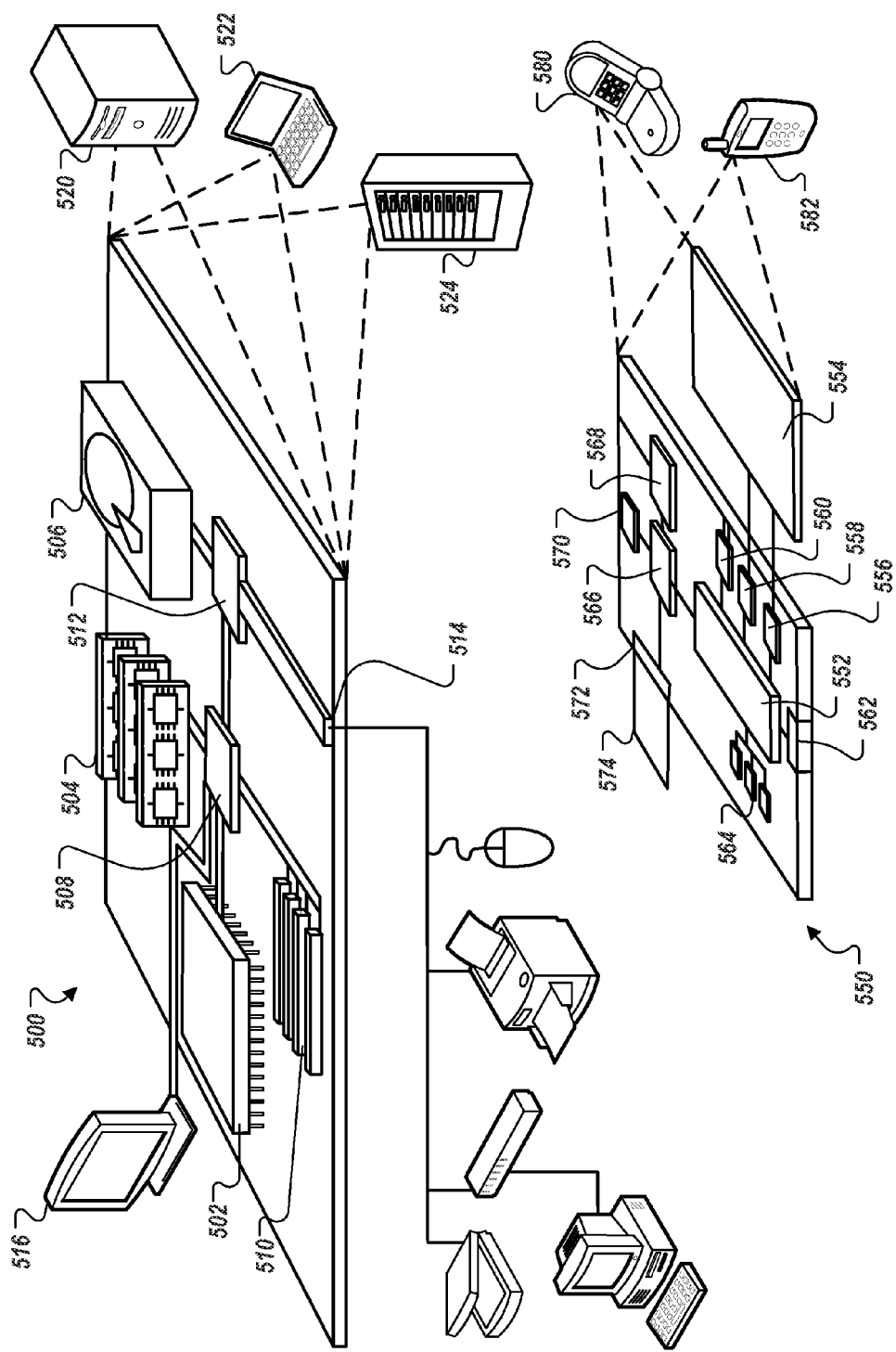
FIG. 5 shows an example of a computer device and a mobile computer device that can be used to implement the techniques described here.

FIG. 5 shows an example of a computer device 500 and a mobile computer device 550 that can be used to implement the techniques described here. Computing device 500 is intended to represent various forms of digital computers, such as laptops, desktops, workstations, personal digital assistants, servers, blade servers, mainframes, and other appropriate computers. Computing device 550 is intended to represent various forms of mobile devices, such as personal digital assistants, cellular telephones, smart phones, and other similar computing devices. The components shown here, their connections and relationships, and their functions, are meant to be exemplary only, and are not meant to limit implementations of the inventions described and/or claimed in this document.

Computing device 500 includes a processor 502, memory 504, a storage device 506, a high-speed interface 508 connecting to memory 504 and high-speed expansion ports 510, and a low speed interface 512 connecting to low speed bus 514 and storage device 506. Each of the components 502, 504, 506, 508, 510, and 512, are interconnected using various busses, and may be mounted on a common motherboard or in other manners as appropriate. The processor 502 can process instructions for execution within the computing device 500, including instructions stored in the memory 504 or on the storage device 506 to display graphical information for a GUI on an external input/output device, such as display 516 coupled to high speed interface 508. In other implementations, multiple processors and/or multiple buses may be used, as appropriate, along with multiple memories and types of memory. Also, multiple computing devices 500 may be connected, with each device providing portions of the necessary operations (e.g., as a server bank, a group of blade servers, or a multi-processor system).

The memory 504 stores information within the computing device 500. In one implementation, the memory 504 is a volatile memory unit or units. In another implementation, the memory 504 is a non-volatile memory unit or units. The memory 504 may also be another form of computer-readable medium, such as a magnetic or optical disk.

The storage device 506 is capable of providing mass storage for the computing device 500. In one implementation, the storage device 506 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 504, the storage device 506, memory on processor 502, or a propagated signal.

The high speed controller 508 manages bandwidth-intensive operations for the computing device 500, while the low speed controller 512 manages lower bandwidth-intensive operations. Such allocation of functions is exemplary only. In one implementation, the high-speed controller 508 is coupled to memory 504, display 516 (e.g., through a graphics processor or accelerator), and to high-speed expansion ports 510, which may accept various expansion cards (not shown). In the implementation, low-speed controller 512 is coupled to storage device 506 and low-speed expansion port 514. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 500 may be implemented in a number of different forms, as shown in the figure. For example, it may be implemented as a standard server 520, or multiple times in a group of such servers. It may also be implemented as part of a rack server system 524. In addition, it may be implemented in a personal computer such as a laptop computer 522. Alternatively, components from computing device 500 may be combined with other components in a mobile device (not shown), such as device 550. Each of such devices may contain one or more of computing device 500, 550, and an entire system may be made up of multiple computing devices 500, 550 communicating with each other.

Computing device 550 includes a processor 552, memory 564, an input/output device such as a display 554, a communication interface 566, and a transceiver 568, among other components. The device 550 may also be provided with a storage device, such as a microdrive or other device, to provide additional storage. Each of the components 550, 552, 564, 554, 566, and 568, are interconnected using various buses, and several of the components may be mounted on a common motherboard or in other manners as appropriate.

The processor 552 can execute instructions within the computing device 550, including instructions stored in the memory 564. The processor may be implemented as a chipset of chips that include separate and multiple analog and digital processors. The processor may provide, for example, for coordination of the other components of the device 550, such as control of user interfaces, applications run by device 550, and wireless communication by device 550.

Processor 552 may communicate with a user through control interface 558 and display interface 556 coupled to a display 554. The display 554 may be, for example, a TFT LCD (Thin-Film-Transistor Liquid Crystal Display) display or an OLED (Organic Light Emitting Diode) display, or other appropriate display technology. The display interface 556 may comprise appropriate circuitry for driving the display 554 to present graphical and other information to a user. The control interface 558 may receive commands from a user and convert them for submission to the processor 552. In addition, an external interface 562 may be provide in communication with processor 552, so as to enable near area communication of device 550 with other devices. External interface 562 may provide, for example, for wired communication in some implementations, or for wireless communication in other implementations, and multiple interfaces may also be used.

The memory 564 stores information within the computing device 550. The memory 564 can be implemented as one or more of a computer-readable medium or media, a volatile memory unit or units, or a non-volatile memory unit or units. Expansion memory 574 may also be provided and connected to device 550 through expansion interface 572, which may include, for example, a SIMM (Single In Line Memory Module) card interface. Such expansion memory 574 may provide extra storage space for device 550, or may also store applications or other information for device 550. Specifically, expansion memory 574 may include instructions to carry out or supplement the processes described above, and may include secure information also. Thus, for example, expansion memory 574 may be provide as a security module for device 550, and may be programmed with instructions that permit secure use of device 550. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 564, expansion memory 574, memory on processor 552, or a propagated signal that may be received, for example, over transceiver 568 or external interface 562.

Device 550 may communicate wirelessly through communication interface 566, which may include digital signal processing circuitry where necessary. Communication interface 566 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 568. In addition, short-range communication may occur, such as using a Bluetooth, WiFi, or other such transceiver (not shown). In addition, GPS (Global Positioning System) receiver module 570 may provide additional navigation- and location-related wireless data to device 550, which may be used as appropriate by applications running on device 550.

Device 550 may also communicate audibly using audio codec 560, which may receive spoken information from a user and convert it to usable digital information. Audio codec 560 may likewise generate audible sound for a user, such as through a speaker, e.g., in a handset of device 550. Such sound may include sound from voice telephone calls, may include recorded sound (e.g., voice messages, music files, etc.) and may also include sound generated by applications operating on device 550.

The computing device 550 may be implemented in a number of different forms, as shown in the figure. For example, it may be implemented as a cellular telephone 580. It may also be implemented as part of a smartphone 582, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

A number of embodiments have been described. Nevertheless, it will be understood that various modifications may be made without departing from the spirit and scope of the inventive concepts disclosed herein. For example, the content of the various EPG's discussed herein have primarily focused on television programming. However, it will be understood that any type of media programming that is scheduled, and where that schedule is made available to the various searching schemes disclosed herein can be made available to the user. For example, broadcasts such as those found on websites (e.g., "YouTube.com" or "podcasts"), radio shows, and other forms of media are considered within the scope of this disclosure. Also considered pertinent are media broadcasts available for purchase, such as pay-per-view events, or "On Demand" events. The user interface components may also be used to organize other grouped queries, such as those searching for books or other retail products, or for items listing on on-line auction or classified sites.

Accordingly, other embodiments are within the scope of the following claims.

What is claimed is:

1. A computer-implemented method for managing media-related queries, comprising:
    receiving media-related search parameters at a computer system, wherein one or more of the media related search parameters includes metadata information that indicates to the computer system that recurrent searches using the one or more media-related search parameters are to be performed;
    storing, in computer memory of the computer system, data for performing a search corresponding to the one or more media-related search parameters, the stored data corresponding to keywords for a search query, and the metadata information;
    periodically, and without receiving a search request from a user, executing the search automatically on the computer system, the search pertaining to the one or more media-related search parameters that include stored metadata information, by providing to a search engine the stored data that corresponds to the keywords for the search query to generate a group of search results that include media programs for the user;
    transmitting, to a device associated with the user, code for displaying the group of search results and one or more visual indicators associated with one or more search results, the group of search results being organized into multiple different topics and particular ones of the search results are associated into one of the topics to which the particular ones of the search results correspond, and wherein the one or more visual indicators comprise a display adjacent to each corresponding topic, the display showing a number of additional search results that are available for each topic; and
    in response to determining that new search results are available, transmitting, to the device associated with the user, code for iteratively updating, with the new search results, the displays of the group of search results and the one or more visual indicators associated with one or more of the search results.

2. The method of claim 1, wherein the media-related search parameters include terms in a boolean search string.

3. The method of claim 1, wherein the media-related search parameters includes an indicator of a program genre.

4. The method of claim 1, wherein the stored data includes terms in a boolean search string.

5. The method of claim 1, wherein the media-related search parameters are received from a third-party after the user's selection of a control associated with the third party.

6. The method of claim 1, further comprising storing a plurality of groups of data for performing a search in individual collections for generating groups of media programs for the user.

7. The method of claim 6, further comprising generating code for displaying the individual collections with an electronic program guide and for positioning the guide relative to a selection of a collection.

8. The method of claim 7, further comprising generating code for displaying the individual collections graphically in a bookshelf of collections.

9. The method of claim 1, wherein storing the data for performing a search corresponding to the parameters comprises organizing the data according to collections associated with each of a plurality of users.

10. The method of claim 1, further comprising copying a collection from a first user to a second user upon receiving a command from the first user.

11. A computer-implemented system, comprising:
a request processor operable on a computer system to receive requests from remote user devices for media programs corresponding to media collections for the users, the requests including media-related search parameters that correspond to keywords for a search query wherein one or more of the media related search parameters includes metadata information that indicates to the computer system that recurrent searches using the one or more media-related search parameters are to be performed;
a media search repository, operable on the computer system, and storing search data corresponding to the one or more media-related search parameters that are associated with one or more media categories for the remote user devices, wherein the stored search data corresponds to keywords for the search query, and the metadata information; and
a persistent search module on the computer system, that (i) periodically and without receiving a search request from a user, executes the search query automatically on the computer system, the search query pertaining to the one or more media-related search parameters that include stored metadata information, by providing to a search engine the stored search data that corresponds to the keywords for the search query, to access the search data and generate, in response, a plurality of search results that include media programs associated with a broadcast period, and transmit to a device associated with the user, (a) code for displaying the group of search results and one or more visual indicators associated with one or more search results and (b) code for iteratively updating and displaying adjacent to each corresponding topic, the group of search results and the one or more visual indicators associated with one or more of the search results, as new search results become available;
wherein the group of search results is organized into multiple different topics and particular ones of the search results are associated into one of the topics to which the particular ones of the search results correspond, and wherein the one or more visual indicators comprise a display showing a number of additional search results that are available for each topic.

12. The system of claim 11, wherein the persistent search module provides the search data to an external public search engine and formats data received in response from the external public search engine to provide media program information to the users.

13. The system of claim 11, wherein the search data comprises search queries associated with the media categories, for provision to the persistent search module.

14. The system of claim 11, further comprising a grid builder module to generate code for displaying an electronic program guide grid that includes programs response to the received requests from remote user devices.

15. The system of claim 11, wherein the search data is organized according to groups of one or more categories for each of a plurality of users.

16. One or more physical non-transient computer-readable media having stored thereon instructions that, when executed, perform actions comprising:
receiving media-related search parameters at a computer system, wherein one or more of the media related search parameters includes metadata information that indicates to the computer system that recurrent searches using the one or more media-related search parameters are to be performed;
storing, in computer memory of the computer system, data for performing a search corresponding to the one or more media-related search parameters, the stored data corresponding to keywords for a search query and the metadata information; and
periodically, and without receiving a search request from a user, executing the search automatically on the computer system, the search pertaining to the one or more media-related search parameters that include stored metadata information, by providing to a search engine the stored data that corresponds to the keywords for the search query to generate a group of search results that include media programs for the user;
transmitting, to a device associated with the user, code for displaying the group of search results and one or more visual indicators associated with one or more search results, the group of search results being organized into multiple different topics and particular ones of the search results are associated into one of the topics to which the particular ones of the search results correspond, and wherein the one or more visual indicators comprise a display adjacent to each corresponding topic, the display showing a number of additional search results that are available for each topic; and
in response to determining that new search results are available, transmitting, to the device associated with the user, code for iteratively updating, with the new search results, the displays of the group of search results and the one or more visual indicators associated with one or more of the search results.

17. The computer-readable media of claim 16, wherein the media-related search parameters include terms in a boolean search string.

18. The computer-readable media of claim 16, wherein the media-related search parameters includes an indicator of a program genre.

19. The computer-readable media of claim 16, wherein the media-related search parameters are received from a third-party after the user's selection of a control associated with the third party.

20. The computer-readable media of claim 16, further comprising storing a plurality of groups of data for performing a search in individual collections for generating groups of media programs for the user.

21. A computer-implemented system, comprising:
a request processor to receive requests from remote user devices for media programs corresponding to media collections for the users, the requests including media-related search parameters that correspond to keywords for a search query, wherein one or more of the media related search parameters includes metadata information that indicates to the computer system that recurrent searches using the one or more media-related search parameters are to be performed;

a media search repository storing search data corresponding to the one or more media-related search parameters that are associated with one or more media categories for the remote user devices, wherein the stored search data corresponds to keywords for the search query, and the metadata information; and means for providing a plurality of media programs associated with a broadcast period to the remote user devices by periodically executing the search query automatically on the computer system by providing to a search engine the stored search data that corresponds to the keywords for the search query to generate a group of search results that include media programs for the users, and transmitting to a device associated with the users, (a) code for displaying the group of search results and one or more visual indicators associated with one or more search results and (b) code for iteratively updating and displaying adjacent to each corresponding topic, the group of search results and the one or more visual indicators associated with one or more of the search results, as new search results become available;

wherein the group of search results is organized into multiple different topics and particular ones of the search results are associated into one of the topics to which the particular ones of the search results correspond, and wherein the one or more visual indicators comprise a display showing a number of additional search results that are available for each topic.

22. The method of claim 1, wherein generating code for displaying the group of search results comprises generating code for displaying a first and a second screen area and simultaneously displaying the group of search results according to the multiple different topics in the first screen area and a schedule grid that lists one or more of the group of generated search results in the second screen area.

* * * * *